(12) United States Patent
Sbiaa et al.

(10) Patent No.: US 7,599,154 B2
(45) Date of Patent: Oct. 6, 2009

(54) STABILIZED SPIN VALVE HEAD AND METHOD OF MANUFACTURE

(75) Inventors: Rachid Sbiaa, Tokyo (JP); Isamu Sato, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/572,067

(22) PCT Filed: Apr. 2, 2004

(86) PCT No.: PCT/JP2004/004831

§ 371 (c)(1),
(2), (4) Date: Mar. 15, 2006

(87) PCT Pub. No.: WO2005/101374

PCT Pub. Date: Oct. 27, 2005

(65) Prior Publication Data

US 2007/0091513 A1    Apr. 26, 2007

(51) Int. Cl.
G11B 5/33 (2006.01)
(52) U.S. Cl. .................................. 360/324.11
(58) Field of Classification Search .............. 360/327.2, 360/324.11, 324, 324.1, 324.12
See application file for complete search history.

(56) References Cited

U.S. PATENT DOCUMENTS

| | | | |
|---|---|---|---|
| 6,717,777 B2 * | 4/2004 | Den et al. | 360/324 |
| 6,980,403 B2 * | 12/2005 | Hasegawa | 360/319 |
| 7,280,325 B1 * | 10/2007 | Pan | 360/324.12 |
| 2002/0159201 A1 | 10/2002 | Li et al. | |
| 2002/0163764 A1 * | 11/2002 | Nakazawa et al. | 360/324.2 |
| 2002/0167768 A1 | 11/2002 | Fontana, Jr. et al. | |
| 2003/0017446 A1 * | 1/2003 | Hasegawn | |
| 2003/0035253 A1 * | 2/2003 | Lin et al. | 360/324 |
| 2003/0174446 A1 | 9/2003 | Hasegawa | |
| 2003/0206382 A1 * | 11/2003 | Carey et al. | 360/324.12 |
| 2004/0201929 A1 * | 10/2004 | Hashimoto et al. | 360/324.1 |

(Continued)

FOREIGN PATENT DOCUMENTS

JP    10-284769 A    10/1998

(Continued)

OTHER PUBLICATIONS

Sun N X Et Al: "Soft high saturation magnetization Fe-Co-N thin films for inductive write heads" IEEE, Apr. 9, 2000, pp. 191-191, XP01539287.*

*Primary Examiner*—Angel A. Castro
(74) *Attorney, Agent, or Firm*—Sughrue Mion, PLLC

(57) ABSTRACT

A magnetoresistive read head includes a spin valve having a multi-layer in-stack bias and side shields to substantially reduce the undesired flux from adjacent bits and tracks, as well as from the transverse field of the recording medium itself. At least one free layer is spaced apart from at least one pinned layer by a spacer. Above the free layer, a capping layer is provided, followed by the in-stack bias, which includes a non-magnetic conductive layer, a ferromagnetic layer having a magnetization fixed by an anti-ferromagnetic layer, and a stabilizing ferromagnetic layer. Additionally, a multilayered side shield is provided, including a thin insulator, a soft buffer layer and a soft side shield layer. As a result, the free layer is shielded from the undesired flux, and recording media having substantially smaller track size and bit size.

15 Claims, 18 Drawing Sheets

U.S. PATENT DOCUMENTS

| | | | |
|---|---|---|---|
| 2005/0201024 A1* | 9/2005 | Gill | 360/324.12 |
| 2005/0219773 A1* | 10/2005 | Li et al. | 360/324.12 |

FOREIGN PATENT DOCUMENTS

| | | | |
|---|---|---|---|
| JP | 2003-218426 A | 7/2003 |
| JP | 2003-264324 A | 9/2003 |
| JP | 2004-014705 A | 1/2004 |
| JP | 2004-079850 A | 3/2004 |

\* cited by examiner

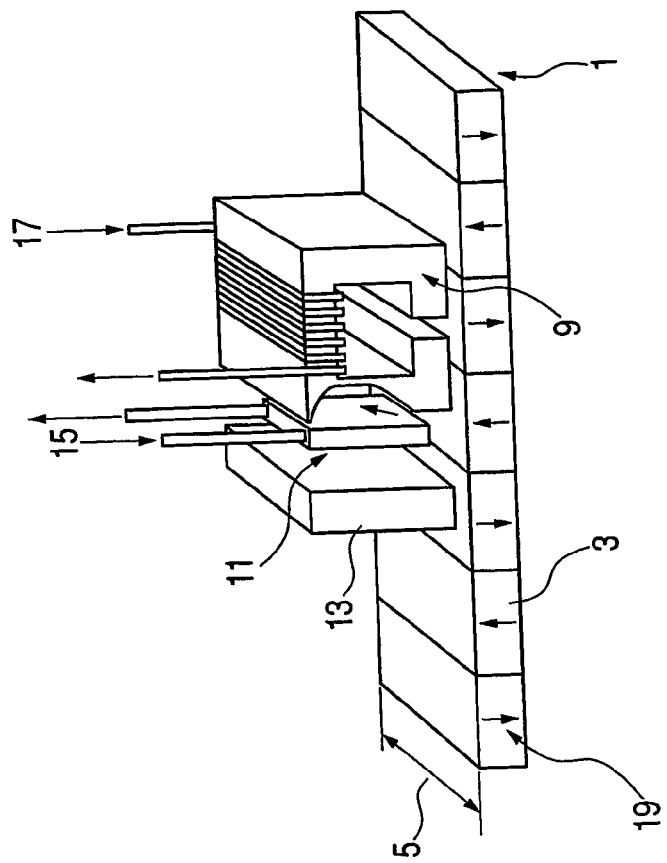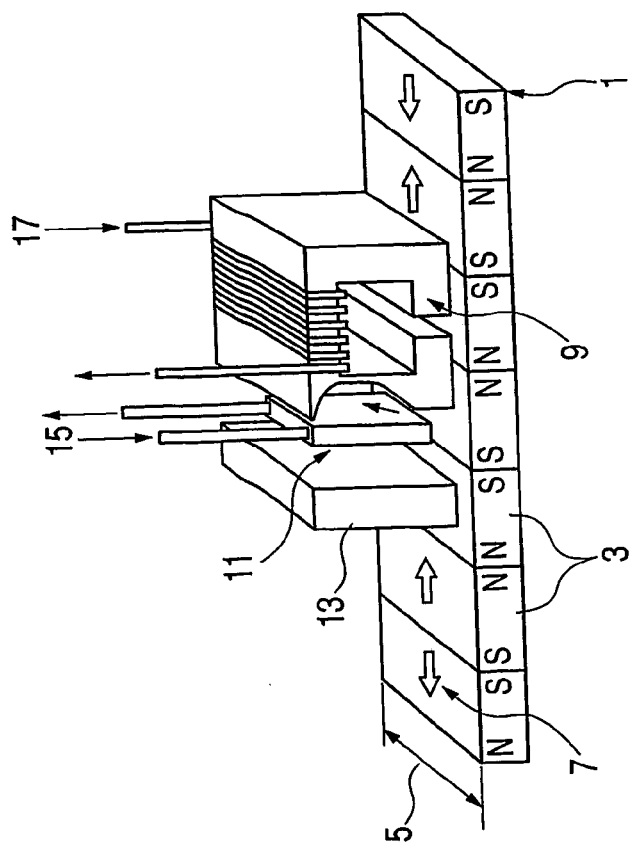

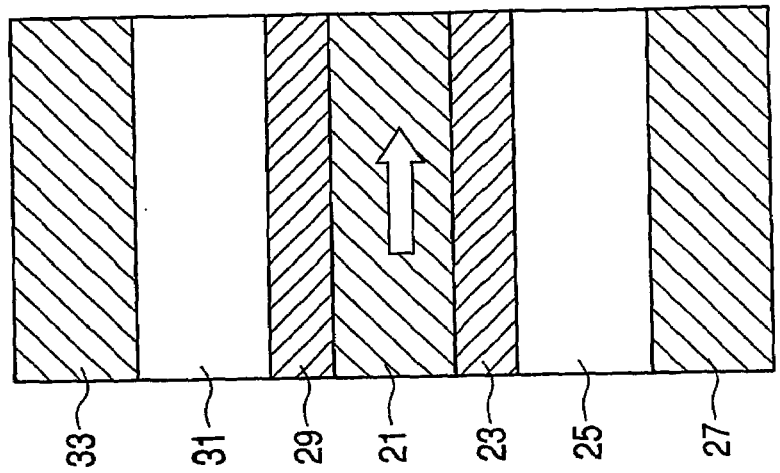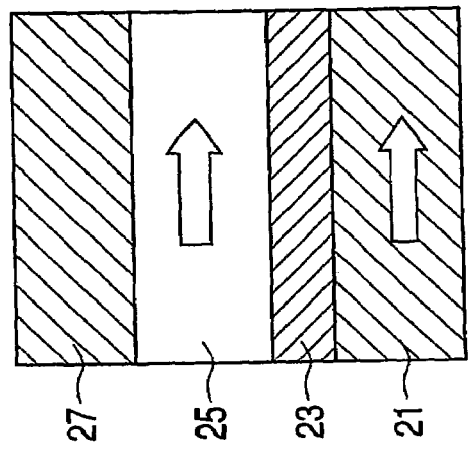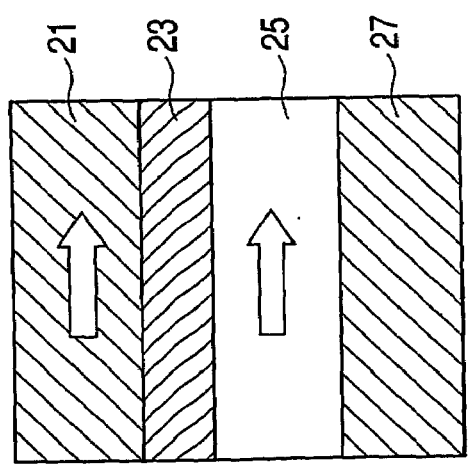

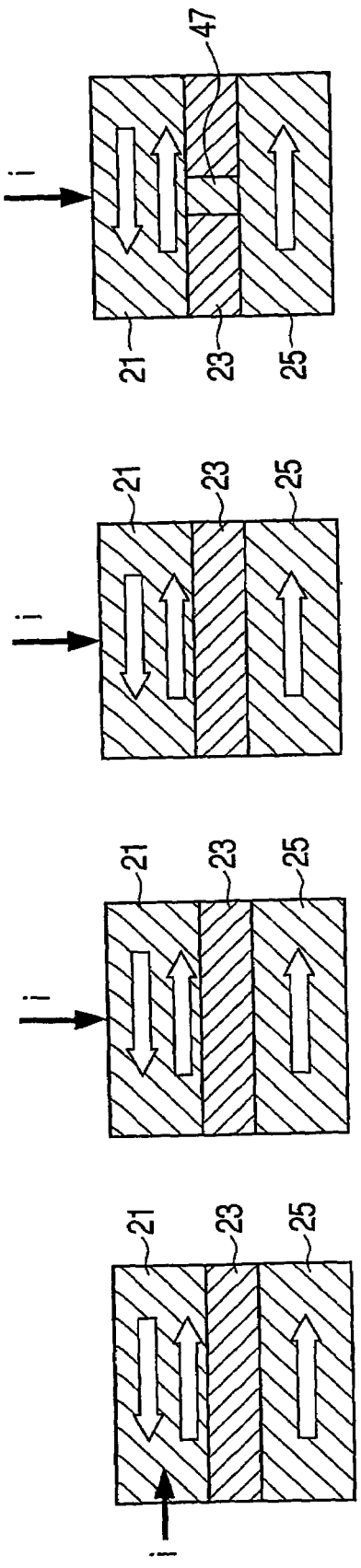

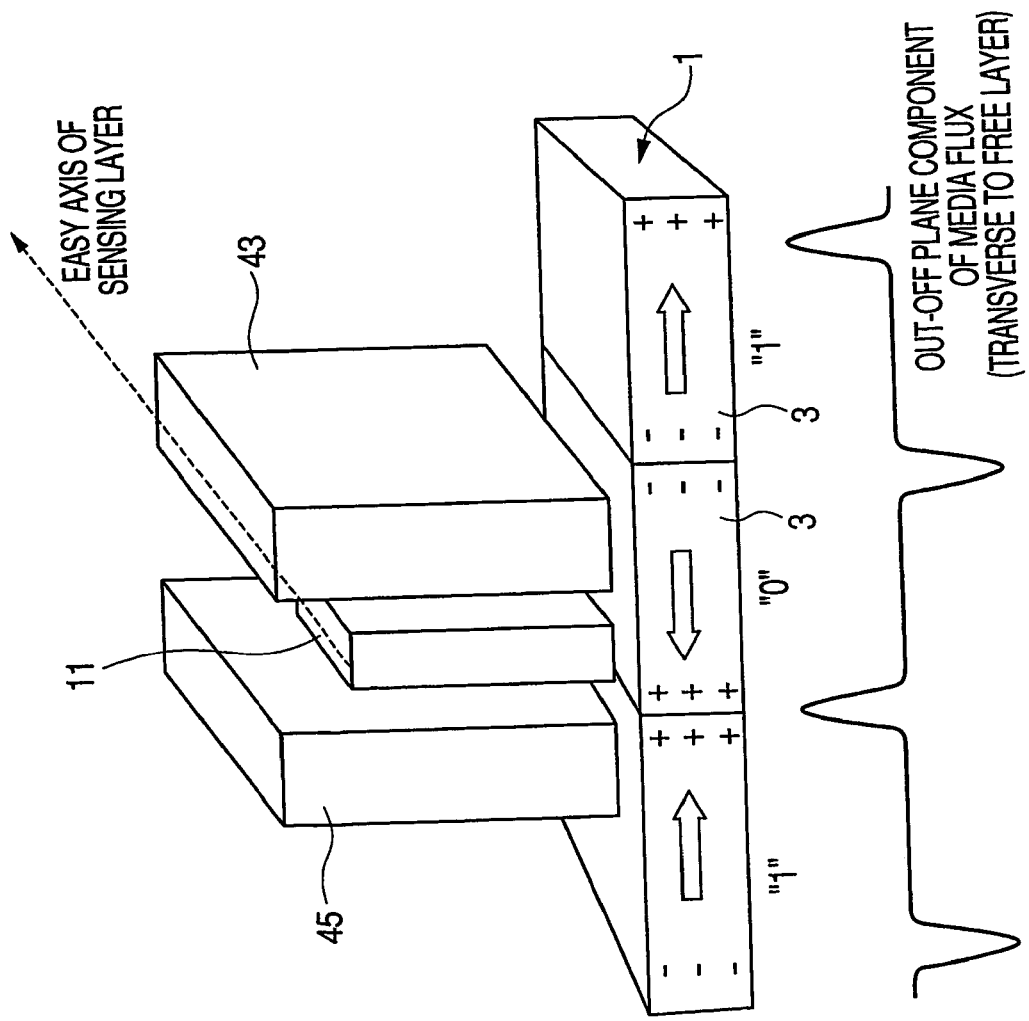

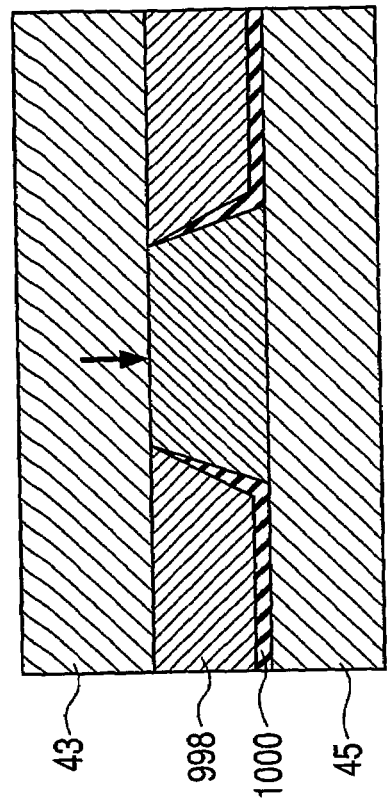
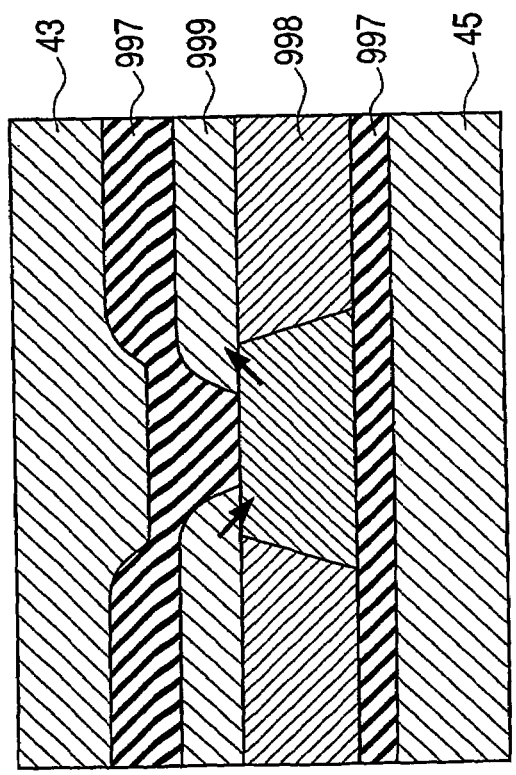
FIG. 7(a)
FIG. 7(b)

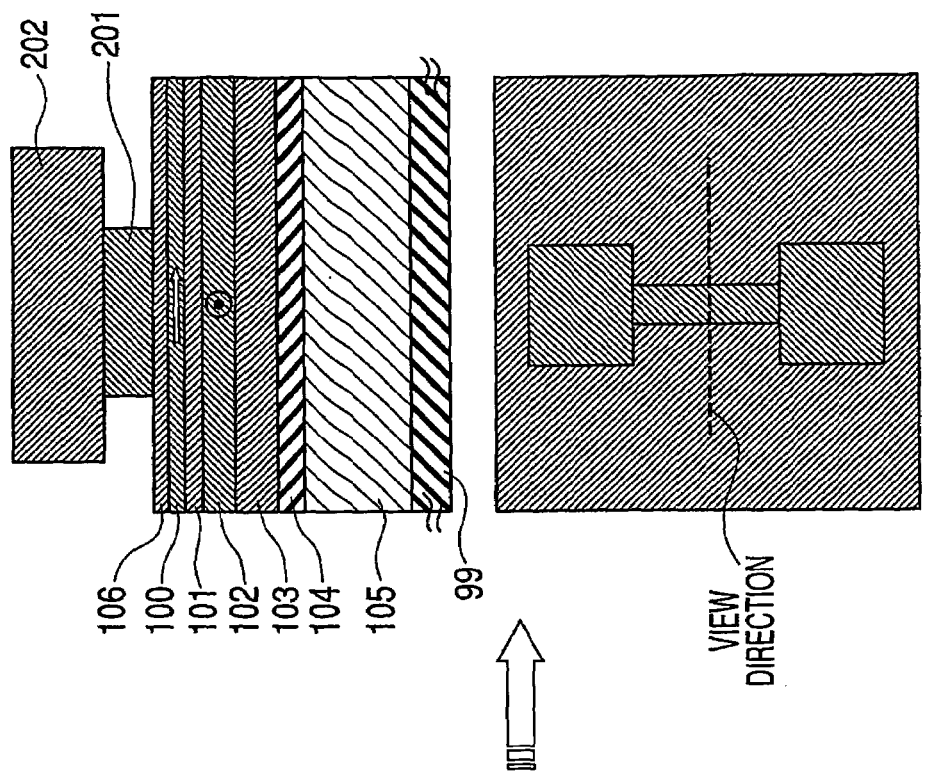
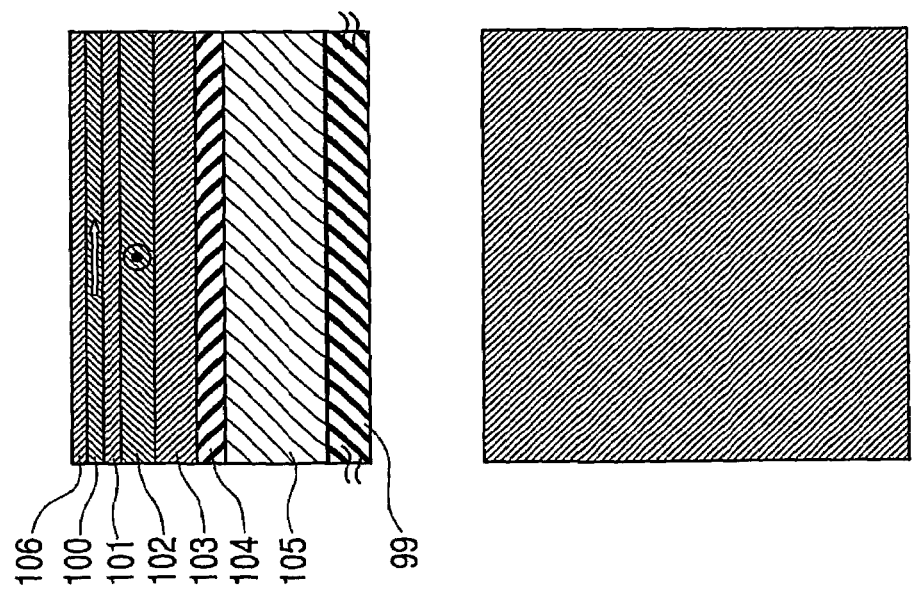
FIG. 9(a)
FIG. 9(b)

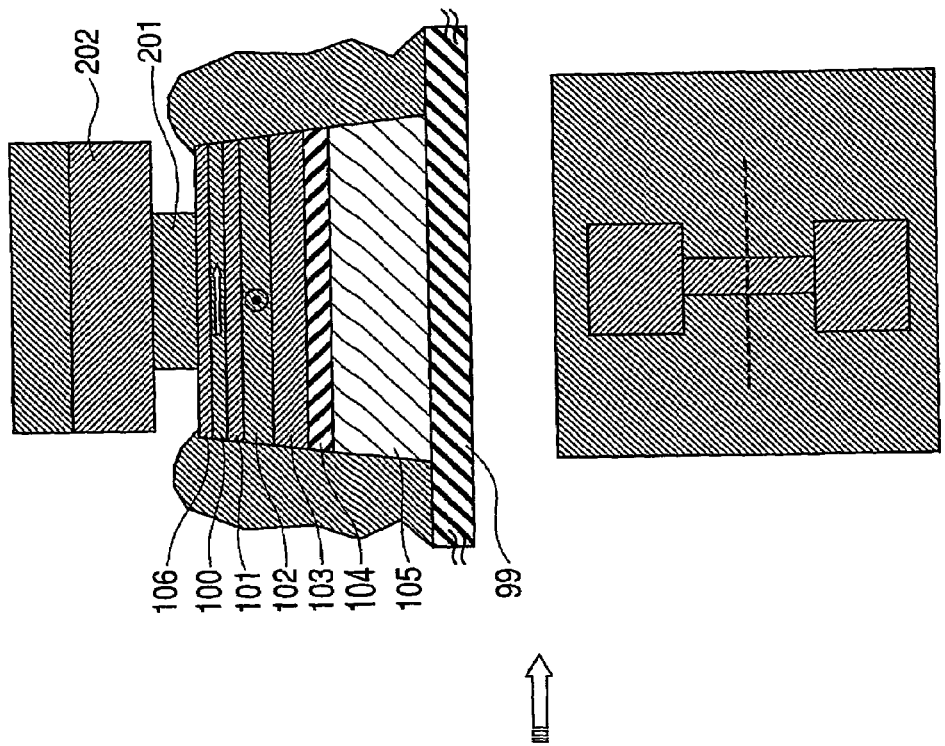
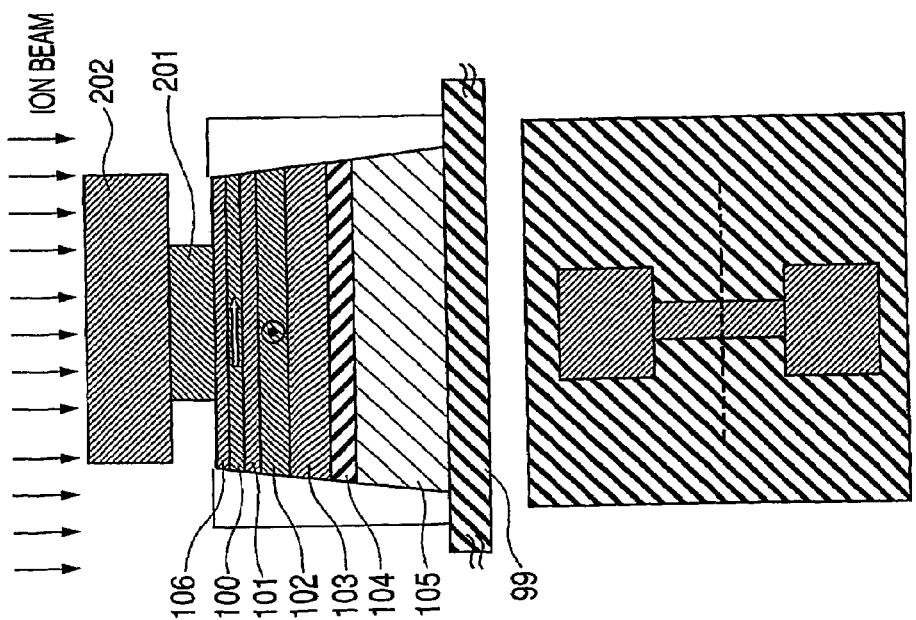
FIG. 9(c)
FIG. 9(d)

FIG. 9(g)
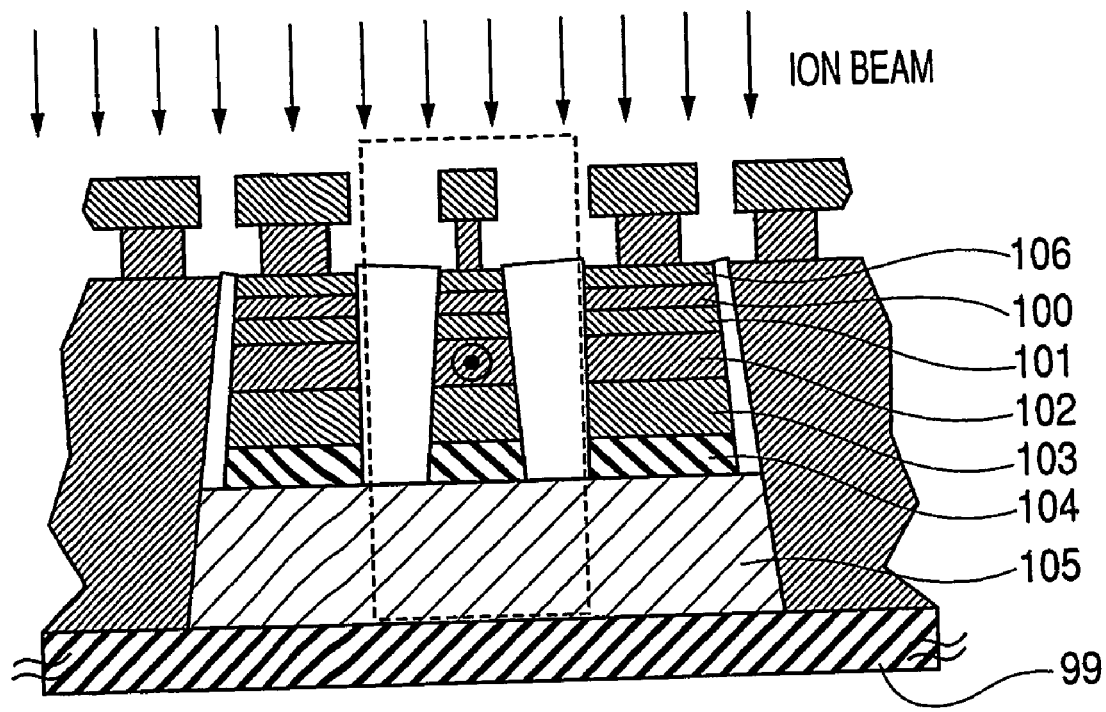
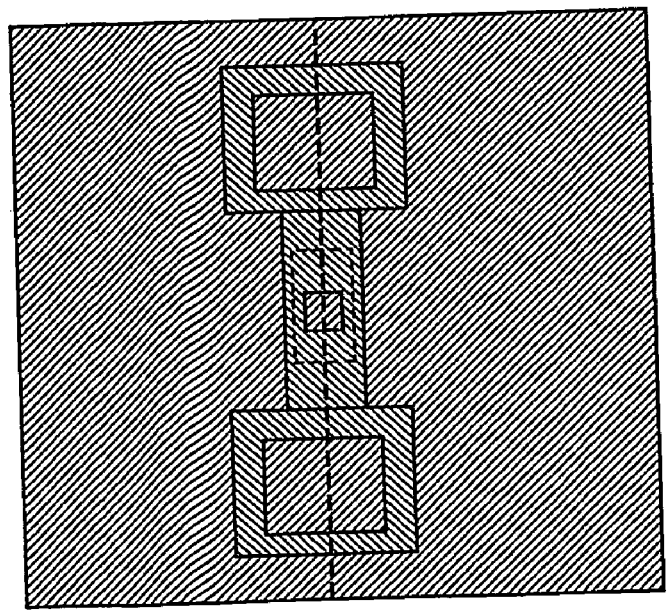

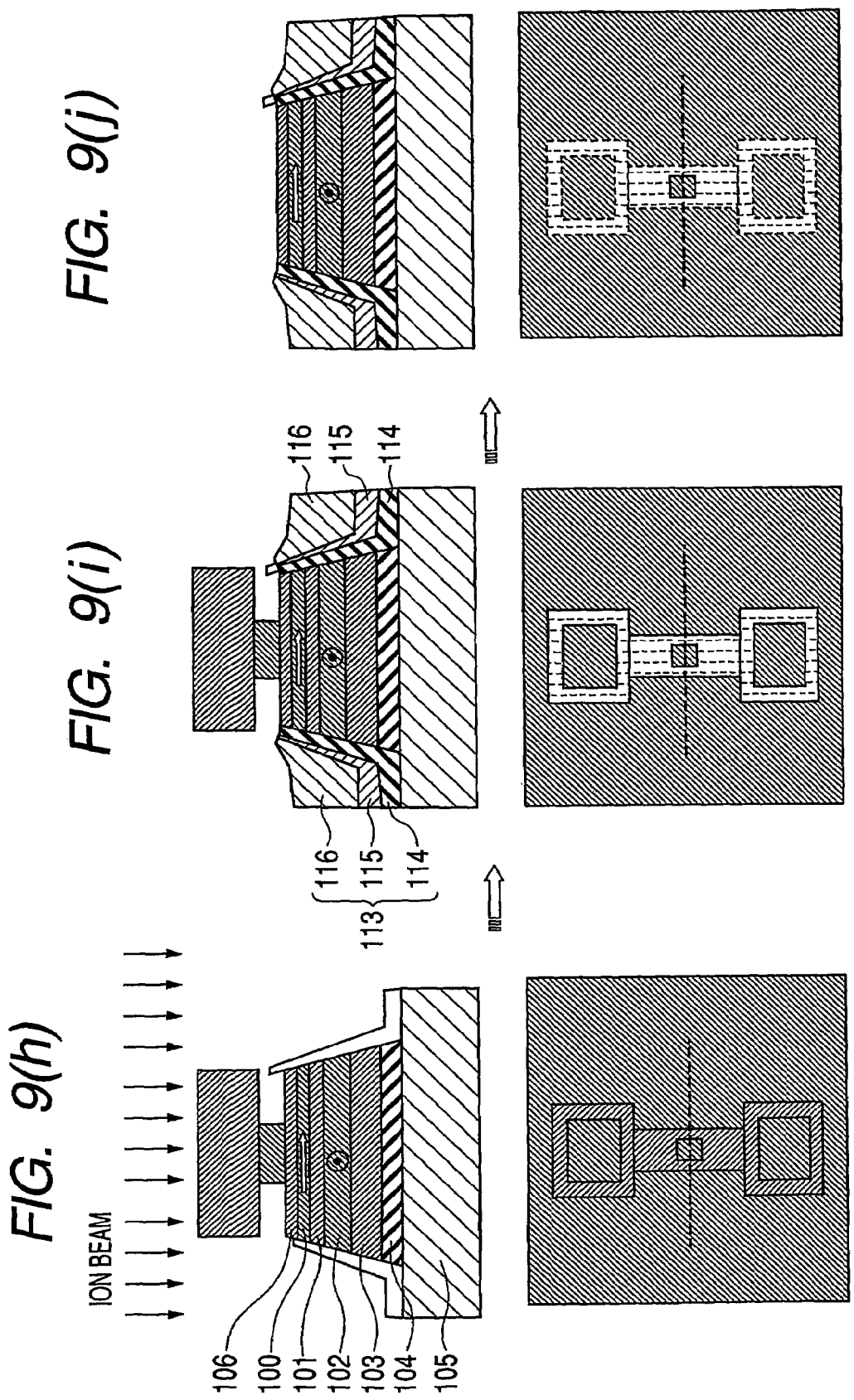

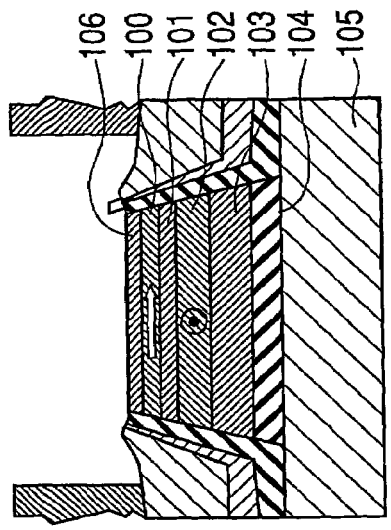
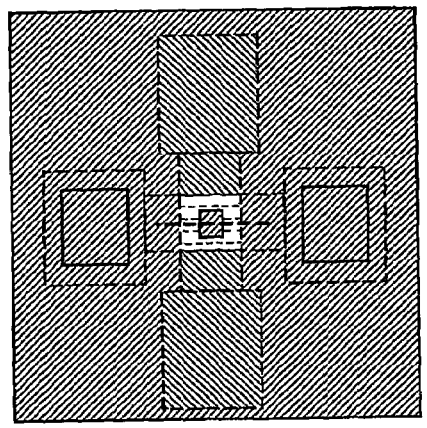
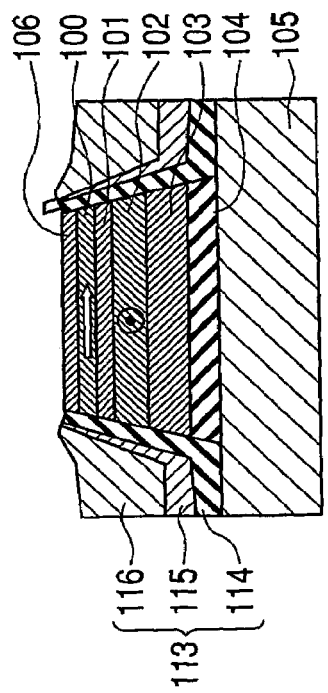
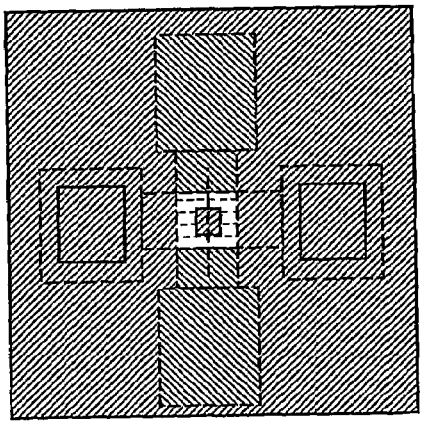
FIG. 9(k)

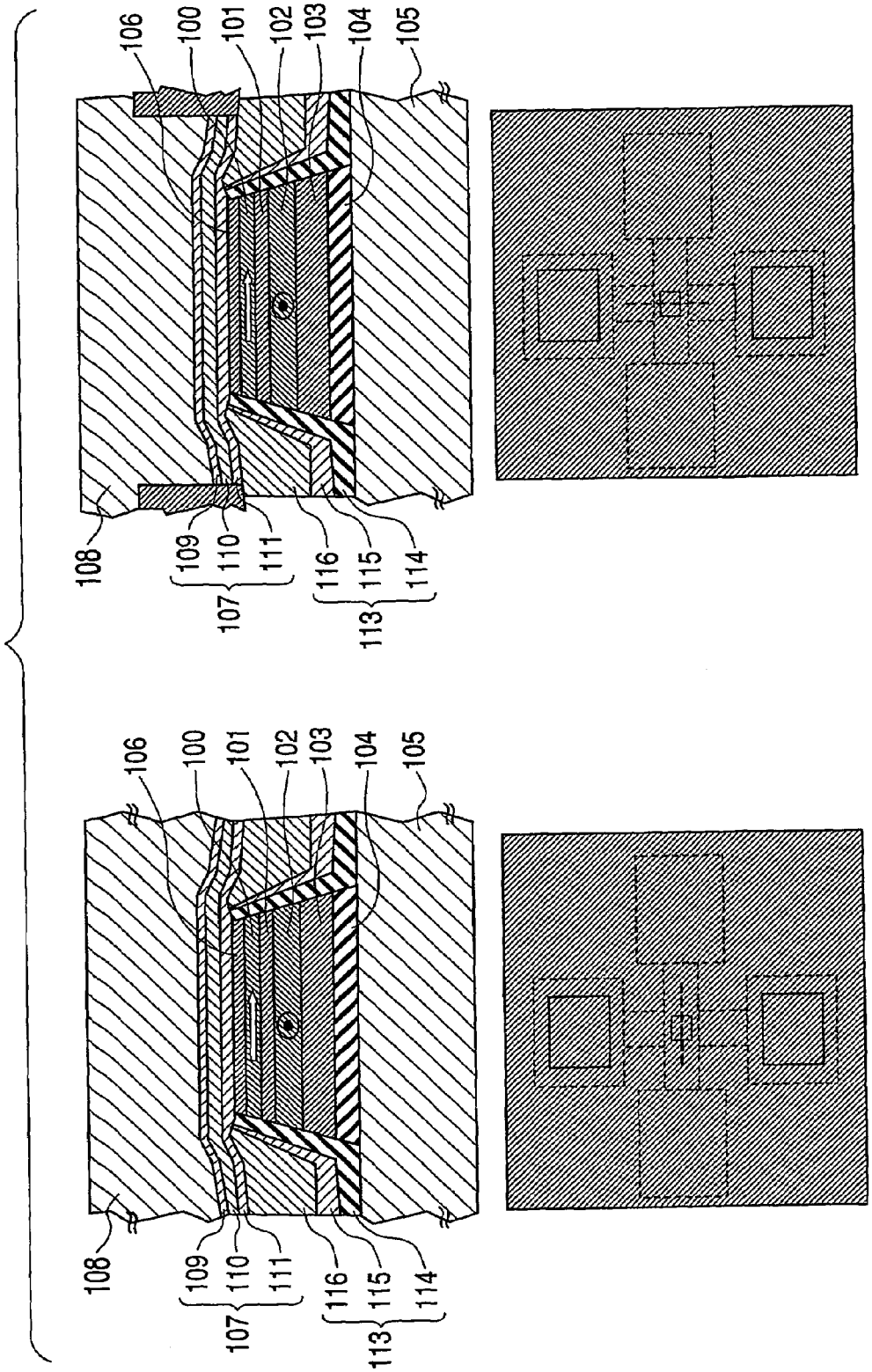

STABILIZED SPIN VALVE HEAD AND METHOD OF MANUFACTURE

TECHNICAL FIELD

The present invention relates to the field of a read element of a magnetoresistive (MR) head, and a method of manufacture therefor. More specifically, the present invention relates to a spin valve of an MR read element having a side shield that provides bias stabilization.

BACKGROUND ART

In the related art magnetic recording technology such as hard disk drives, a head is equipped with a reader and a writer. The reader and writer have separate functions and operate independently of one another, with no interaction therebetween.

FIGS. 1(a) and (b) illustrate related art magnetic recording schemes. In FIG. 1(a), a recording medium 1 having a plurality of bits 3 and a track width 5 has a magnetization parallel to the plane of the recording media. As a result, a magnetic flux is generated at the boundaries between the bits 3. This is also commonly referred to as "longitudinal magnetic recording media" (LMR).

Information is written to the recording medium 1 by an inductive write element 9, and data is read from the recording medium 1 by a read element 11. A write current 17 is supplied to the inductive write element 9, and a read current is supplied to the read element 11.

The read element 11 is a magnetic sensor that operates by sensing the resistance change as the sensor magnetization direction changes according to the media flux. A shield 13 is also provided to reduce the undesirable magnetic fields coming from the media and prevent the undesired flux of adjacent bits from interfering with the one of the bits 3 that is currently being read by the read element 11.

The area density of the related art recording medium 1 has increased substantially over the past few years, and is expected to continue to increase substantially. Correspondingly, the bit and track densities are expected to increase. As a result, the related art reader must be able to read this data having increased density at a higher efficiency and speed.

In the related art, the density of bits has increased much faster than the track density. However, the aspect ratio between bit size and track size is decreasing. Currently, this factor is about 8, and it is estimated that in the future, this factor will decrease to 6 or less as recording density approaches terabyte size.

As a result, the track width will become so small that the magnetic field from the adjacent tracks, and not just the adjacent bits, will affect the read sensor. Table 1 shows the estimated scaling parameters based on these changes.

TABLE 1

| Areal Density Gbpsi | bit density (Mbpi) | track density (ktpi) | bit aspect ratio (bit/track) | bit length nm | read track width nm | Track pitch nm |
|---|---|---|---|---|---|---|
| 200 | 1.2 | 160 | 7.5 | 20 | 100 | 150 |
| 400 | 1.8 | 222 | 8.1 | 14.1 | 76 | 110 |
| 600 | 2 | 300 | 6.7 | 12.7 | 55 | 85 |
| 1000 | 2.5 | 380 | 6.5 | 9.7 | 45 | ~? |

Another related art magnetic recording scheme has been developed as shown in FIG. 1(b). In this related art scheme, the direction of magnetization 19 of the recording medium 1 is perpendicular to the plane of the recording medium. This is also known as "perpendicular magnetic recording media" (PMR).

This PMR design provides more compact and stable recorded data. However, with PMR media the transverse field coming from the recording medium, in addition to the above-discussed effects of the neighboring media tracks, must also be considered. This effect is discussed below with respect to FIG. 6(b).

The flux is highest at the center of the bit, decreases toward the ends of the bit and approaches zero at the ends of the bit. As a result, there is a strong transverse component to the recording medium field at the ends of the bit, in contrast to the above-discussed LMR scheme, where the flux is highest at the edges of the bits.

FIGS. 2(a)-(c) illustrate various related art read sensors for the above-described magnetic recording scheme, also known as "spin valves". In the bottom type spin valve illustrated in FIG. 2(a), a free layer 21 operates as a sensor to read the recorded data from the recording medium 1. A spacer 23 is positioned between the free layer 21 and a pinned layer 25. On the other side of the pinned layer 25, there is an anti-ferromagnetic (AFM) layer 27.

In the top type spin valve illustrated in FIG. 2(b), the position of the layers is reversed. FIG. 2(c) illustrates a related art dual type spin valve. Layers 21 through 25 are substantially the same as described above with respect to FIGS. 2(a)-(b). An additional spacer 29 is provided on the other side of the free layer 21, upon which a second pinned layer 31 and a second AFM layer 33 are positioned. The dual type spin valve operates according to the same principle as described above with respect to FIGS. 2(a)-(b). However, a larger resistance change and MR ratio can be achieved.

In the read head based on the MR spin valve, the magnetization of the pinned layer 25 is fixed by exchange coupling with the AFM layer. Only the magnetization of the free layer 21 can rotate according to the media field direction.

In the recording media 1, flux is generated based on polarity of adjacent bits. If two adjoining bits have negative polarity at their boundary the flux will be negative, and if both of the bits have positive polarity at the boundary the flux will be positive. The magnitude of flux determines the angle of magnetization between the free layer and the pinned layer.

When the magnetizations of the pinned and free layers are in the same direction, then the resistance is low. On the other hand, when their magnetizations are in opposite directions the resistance is high. In the MR head application, when no external magnetic field is applied, the free layer 21 and pinned layer 25 have their magnetizations at 90 degree with respect to each other.

If the spin polarization of the ferromagnetic layer is low, electron spin state can be more easily changed, in which case a small resistance change can be measured. On the other hand, if the ferromagnetic layer spin polarization is high, electrons crossing the ferromagnetic layer can keep their spin state and high resistance change can be achieved. Therefore, there is a related art need to have a high spin polarization material.

When an external field (flux) is applied to a reader, the magnetization of the free layer 21 is altered, or rotated by an angle. When the flux is positive the magnetization of the free layer is rotated upward, and when the flux is negative the magnetization of the free layer is rotated downward. Further, if the applied external field results in the free layer 21 and the pinned layer 25 having the same magnetization direction, then the resistance between the layers is low, and electrons can more easily migrate between those layers 21, 25.

However, when the free layer 21 has a magnetization direction opposite to that of the pinned layer 25, the resistance between the layers is high. As a result, it is more difficult for electrons to migrate between the layers 21, 25.

The AFM layer 27 provides an exchange coupling and keeps the magnetization of pinned layer 25 fixed. In the related art, the AFM layer 27 is usually PtMn or IrMn.

The resistance change ΔR between the states when the magnetizations of layers 21, 25 are parallel and anti-parallel should be high to have a highly sensitive reader. As head size decreases, the sensitivity of the reader becomes increasingly important, especially when the magnitude of the media flux is decreased. Thus, there is a need for high ΔR of the related art spin valve.

FIG. 6(a) graphically shows the foregoing principle for the related art longitudinal magnetic recording scheme illustrated in FIG. 1(a). As the media spins, the flux at the boundary between bits acts to the free layer which magnetization rotates upward and downward according to the related art spin valve principles.

FIG. 6(b) illustrates the related art perpendicular magnetic recording, with the effect of the field generated by the bit itself. Additionally, a related art intermediate layer (not shown) between the recording layer and a soft underlayer 20 of the perpendicular recording medium may also be provided. The intermediate layer provides improved control of exchange coupling between the layers.

U.S. Patent publication nos. 2002/0167768 and 2003/0174446, the contents of which are incorporated herein by reference, discloses side shields to avoid flux generated by adjacent tracks, along with an in-stack bias.

FIG. 10 illustrates this related art spin valve structure. In addition to the related art configuration of the free layer 21 and the spacer 23 (the other above-discussed portions of the spin valve are omitted for the sake of simplicity), the related art in-stack bias 22 includes a decoupling layer 24 sandwiched between the free layer 21 and a stabilizer layer 26 and an AFM 28 layer above the stabilizer layer 26. A cap 30 is provided above the in-stack bias.

Because the in-stack bias 22 is substantially smaller than the free layer 21 located below, the magnetic domain at the edge of the free layer is not completely aligned with the easy axis (i.e., the axis of the sensing layer, which is the Y-axis of FIG. 6(b)).

Accordingly, these related art shields have various problems and disadvantages. For example, but not by way of limitation, when the free layer 21 has a width of less than 100 nm, the magnetic moments are randomly distributed at the edge, which is a source of noise 34 as shown in FIG. 10. The noise source region 34 of the free layer 21 is not stabilized. Thus, undesired magnetic fluctuation is generated.

As the width of the free layer 21 decreases, the demagnetizing field increases. For example, the magnetization of the free layer 21 may begin to switch at the edge of the free layer 21 and work toward the center of the free layer 21. Further fluctuations of magnetization accelerate this switching process.

Additionally, ion milling can damage the free layer edge. Further, the in-stack bias 22 that uses the anti-ferromagnetic (AFM) layer 28 to pin the stabilizer layer 26 is shorter than the stabilizer layer 26. As a result, the stabilizer layer 26 is not fully pinned, and cannot provide the maximum stability.

Also, as shield-to-shield spacing declines below about 40 nm, it is difficult to avoid current leakage to the side of the MR element.

As a result of the foregoing related art problems, there is a need to provide adequate shielding from the undesired flux effects of the above-described transverse field at the edge, and shield the bit from the flux generated at adjacent tracks as well as adjacent bits within a track. There is also a need to prevent the related art problems associated with flux perturbation caused by the noise generated in the free layer 21 due to the related art design of the in-stack bias 22.

In addition to the foregoing related art spin valve in which the pinned layer is a single layer, FIG. 3 illustrates a related art synthetic spin valve. The free layer 21, the spacer 23 and the AFM layer 27 are substantially the same as described above. However, the pinned layer further includes a first sublayer 35 separated from a second sublayer 37 by a spacer 39.

In the related art synthetic spin valve, the first sublayer 35 operates according to the above-described principle with respect to the pinned layer 25. Additionally, the second sublayer 37 has an opposite spin state with respect to the first sublayer 35. As a result, the pinned layer total moment is reduced due to anti-ferromagnetic coupling between the first sublayer 35 and the second sublayer 37. A synthetic spin-valve head has a total flux close to zero, high resistance change ΔR and greater stability.

FIG. 4 illustrates the related art synthetic spin valve with a shielding structure. As noted above, it is important to avoid unintended magnetic flux from adjacent bits from being sensed during the reading of a given bit. Therefore, a top shield 43 is provided on an upper surface of the free layer 21. Similarly, a bottom shield 45 is provided on a lower surface of the AFM layer 27. The effect of the shield system is shown in and discussed with respect to FIG. 6.

As shown in FIGS. 5(a)-(d), there are four related art types of spin valves. The type of spin valve structurally varies based on the structure of the spacer 23.

The related art spin valve illustrated in FIG. 5(a) uses the spacer 23 as a conductor, and is used for the related art CIP scheme illustrated in FIG. 1(a) for a giant magnetoresistance (GMR) type spin valve where the current is flowing in-plane-to the film. In the related art, a dual-type version of this CIP-GMR valve is commonly used.

In the related art GMR spin valve, resistance is minimized when the magnetization directions (or spin states) of the free layer 21 and the pinned layer 25 are parallel, and is maximized when the magnetization directions are opposite. as noted above, the free layer 21 has a spin that can be changed. Thus, perturbation of the head can be avoided by minimizing the undesired change of the pinned layer magnetization.

The MR ratio depends on the degree of spin polarization of the pinned and free layers, and the angle between their magnetizations. Spin polarization depends on the difference between the number of electrons in spin state up and down normalized by the total number of the conduction electronsin each of the free and pinned layered. These concepts are discussed in greater detail below.

As the free layer 21 receives the flux that signifies bit transition, the free layer magnetization rotates by a small angle in one direction or the other, depending on the direction of flux. The change in resistance between the pinned layer 25 and the free layer 21 is proportional to angle between the magnetizations of the free layer 21 and the pinned layer 25. There is a relationship between resistance change ΔR and efficiency of the reader.

The GMR spin valve has various requirements. For example, but not by way of limitation, a large difference in resistance is required to generate a high output signal. Further, low coercivity is desired, so that small media fields can also be detected. With high pinning field strength, the pinned layer magnetization direction is fixed against external magnetic field , and when the interlayer coupling is low, the sensing layer is not adversely affected by the pinned layer. Further, low magnetistriction is desired to minimize stress on the free layer.

In order to increase the recording density, the track width of the GMR sensor must be made smaller. In this aspect read head operating in CIP scheme (current-in-plane), various issues arise as the size of the sensor decreases. The magnetoresistance (MR) in CIP mode is generally limited to about 20%. When the electrode connected to the sensor is reduced in size overheating results and may potentially damage the sensor, as can be seen from FIG. 7a. Further, the signal available from CIP sensor is proportional to the MR head width.

To address the foregoing issues and as shown in FIG. 7(b), related art CPP-GMR scheme is using a sense current which flows in the direction of spin valve thickness. As a result, size can be reduced and efficiency can be increased. Various related art spin valves that operate in the CPP scheme are illustrated in FIGS. 5(b)-(d), and are discussed in greater detail below.

FIG. 5(b) illustrates a related art tunneling magnetoresistive (TMR) spin valve. In the TMR spin valve, the spacer 23 acts as an insulator, or tunnel barrier layer. Thus, electrons can tunnel from free layer to pinned layer through the insulator barrier 23. TMR spin valves have an increased MR on the order of about 30-50%.

FIG. 5(c) illustrates a related art CPP-GMR spin valve. While the general concept of GMR is similar to that described above with respect to CIP-GMR, the current is flowing perpendicular to the plane, instead of in line with the plane. As a result, the resistance change ΔR and the intrinsic MR are higher than the CIP-GMR.

In the related art CPP-GMR spin valve, there is a need for a large ΔR*A (A is the area of the MR element) and a moderate head resistance. A low free layer coercivity is required so that a small media field can be detected. The pinning field should also have a high strength.

FIGS. 7(a)-(b) illustrate the structural difference between the CIP and CPP GMR spin valves. As shown in FIG. 7(a), there is a hard bias 998 on the sides of the GMR spin valve, with an electrode 999 on upper surfaces of the GMR. Gaps 997 are also required. As shown in FIG. 7(b), in the CPP-GMR spin valve, an insulator 1000 is deposited at the side of the spin valve that the sensing current can only flow in the film thickness direction. Further, no gap is needed in the CPP-GMR spin valve.

As a result, the sense current has a much larger surface through which to flow, and hence, the overheating issue is substantially addressed.

FIG. 5(d) illustrates the related art ballistic magnetoresistance (BMR) spin valve. In the spacer 23, which operates as an insulator, a ferromagnetic layer particles 47 connects the pinned layer 25 to the free layer 21. The area of contact is on the order of few nanometers. As a result, there is an MR of about 100,000%, due to scattering at the domain wall created within this nanocontact as reported by S.Z. Hua et al. [Physical Review B67, 060401(R), 2003]. Other factors include the spin polarization of the ferromagnets, and the structure of the domain that is in nano-contact with the BMR spin valve.

However, the related art BMR spin valve is in early development, and is not in commercial use. Further, there are related art problems with the BMR spin valve in that nano-contact shape and size controllability and stability of the domain wall must be further developed. Additionally, the repeatability of the BMR technology is yet to be shown for high reliability.

In the foregoing related ad spin valves of FIGS. 5 (a)-(d), the spacer 23 of the spin valve is an insulator for TMR, a conductor for GMR, and an insulator having a magnetic nano-sized connector for BMR. While related art TMR spacers are generally made of more insulating materials such as aluminum, related art GMR spacers are generally made of more conductive metals, such as copper.

DISCLOSURE OF INVENTION

It is an object of the present invention to overcome at least the aforementioned problems and disadvantages of the related art. However, it is not necessary for the present invention to overcome those problems and disadvantages, nor any problems and disadvantages.

To achieve at least this object and other objects, a magnetic sensor for reading a recording medium and having a spin valve is provided that includes a free layer having an adjustable magnetization direction in response to a magnetic field received from the recording medium, and a pinned layer having a fixed magnetization by an antiferromagnetic (AFM) layer positioned on a surface of the pinned layer opposite a spacer sandwiched between the pinned layer and the free layer. The sensor also includes a buffer sandwiched between the AFM layer and a bottom shield that shields undesired flux at a first outer surface of the magnetic sensor, a capping layer sandwiched between the free layer and a top shield that shields undesired flux at a second outer surface of the magnetic sensor, and a stabilizer positioned on sides of the magnetic sensor laterally and between the capping layer and the top shield vertically, wherein the stabilizer is substantially wider than the free layer.

In another exemplary, non-limiting embodiment of the present invention, a method of fabricating a magnetic sensor. More specifically, on a wafer, the method includes forming a free layer having an adjustable magnetization direction in response to a magnetic field from said recording medium, a pinned layer having a fixed magnetization direction by exchange coupling with an antiferromagnetic (AFM) layer positioned on a surface of said pinned layer opposite a spacer sandwiched between said pinned layer and said free layer, a buffer sandwiched between said AFM layer and a bottom shield that shields undesired flux at a first outer surface of said magnetic sensor, and a capping layer on said free layer. Additional steps include forming a first mask on a first region on said capping layer, performing a first ion milling step to generate a sensor region, depositing an insulator thereon, and removing said first mask, and forming a second mask on predetermined portions of said first region. Further steps include performing a second ion milling step to generate a shape of said magnetic sensor, depositing a first stabilizing layer on sides of said magnetic sensor and then removing said second mask, and depositing a second stabilizing layer and a top shield on said capping layer and said first stabilizing layer, wherein said second stabilizing layer is substantially wider than said free layer.

BRIEF DESCRIPTION OF DRAWINGS

The above and other objects and advantages of the present invention will become more apparent by describing in detail preferred exemplary embodiments thereof with reference to the accompanying drawings, wherein like reference numerals designate like or corresponding parts throughout the several views, and wherein:

FIGS. 1(a) and (b) illustrates a related art magnetic recording scheme having in-plane and perpendicular-to-plane magnetization, respectively;

FIGS. 2(a)-(c) illustrate related art bottom, top and dual type spin valves;

FIGS. 5(a)-(d) illustrates various related art magnetic reader spin valve systems;

FIGS. 6(a)-(b) illustrate the operation of a related art GMR sensor system;

FIGS. 7(a)-(b) illustrate related art CIP and CPP GMR systems, respectively.

MODES FOR CARRYING OUT THE INVENTION

Referring now to the accompanying drawings, description will be given of preferred embodiments of the invention.

In an exemplary, non-limiting embodiment of the present invention, a novel spin valve for a magnetoresistive head having an enlarged in-stack bias that substantially stabilizes effectively the free layer as well as side shields that reduces flux interference from adjacent tracks and the transverse media field is provided, resulting in an improved spin valve.

Figure 3:
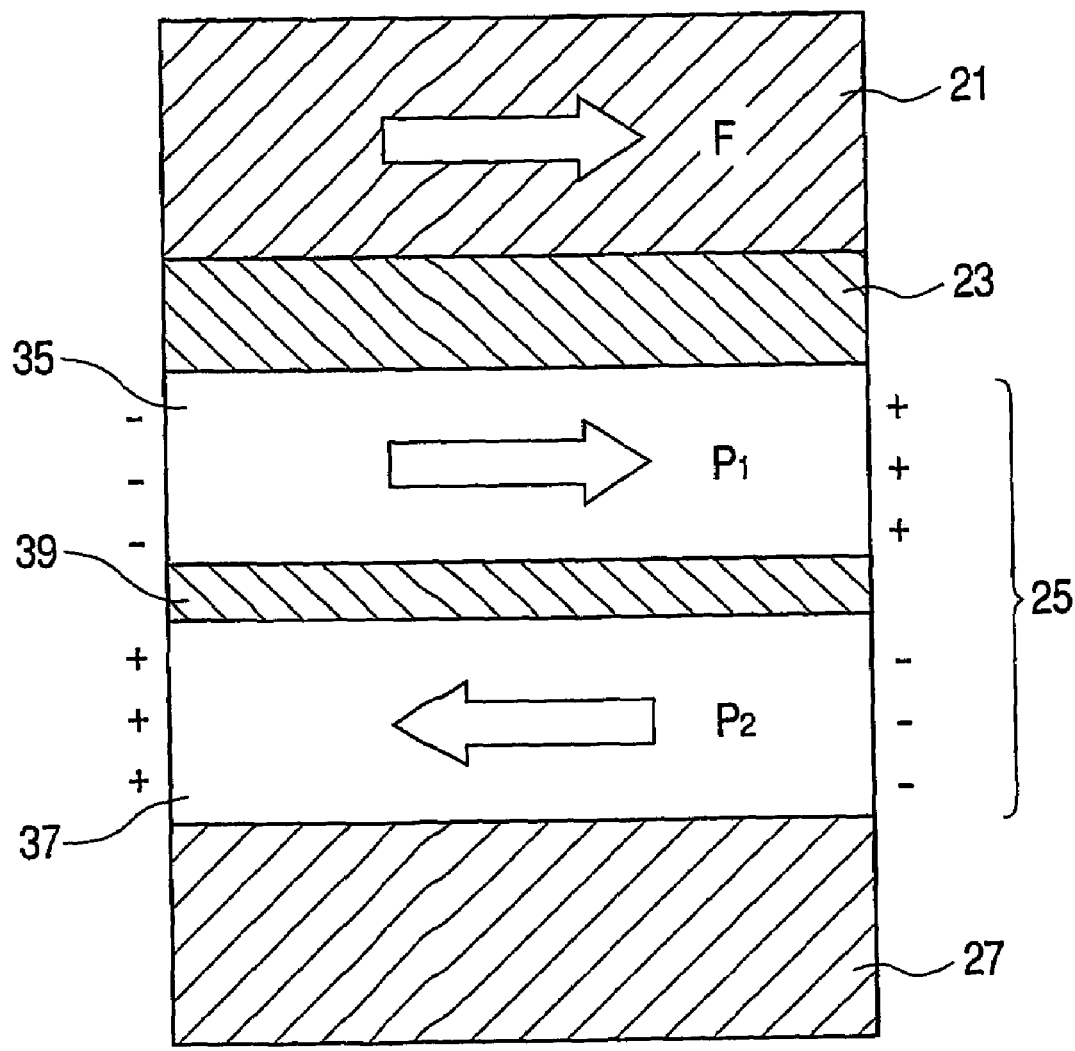
FIG. 3 illustrates a related art synthetic spin valve.
Figure 4:
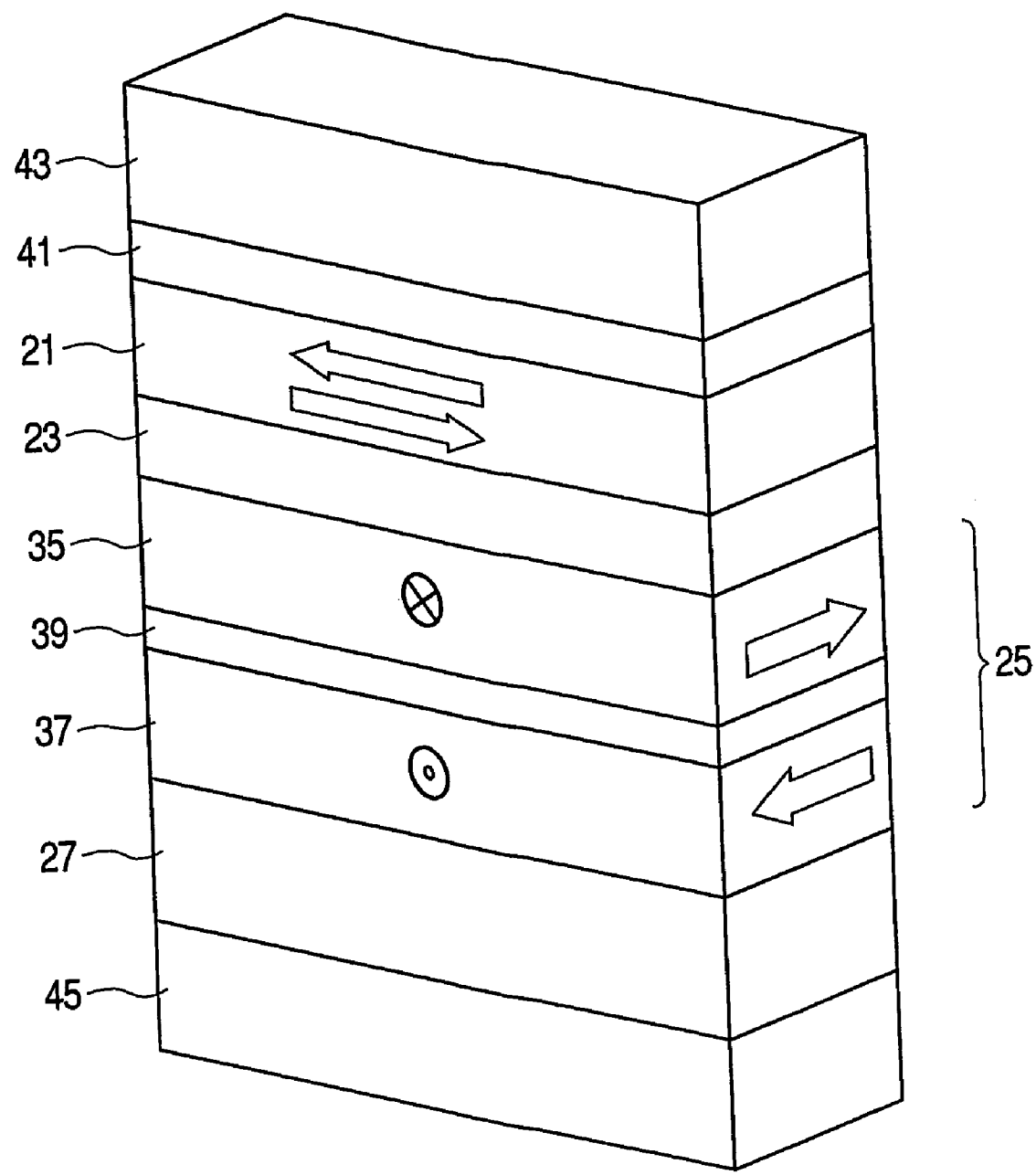
FIG. 4 illustrates a related art synthetic spin valve having a shielding structure.
Figure 6B:
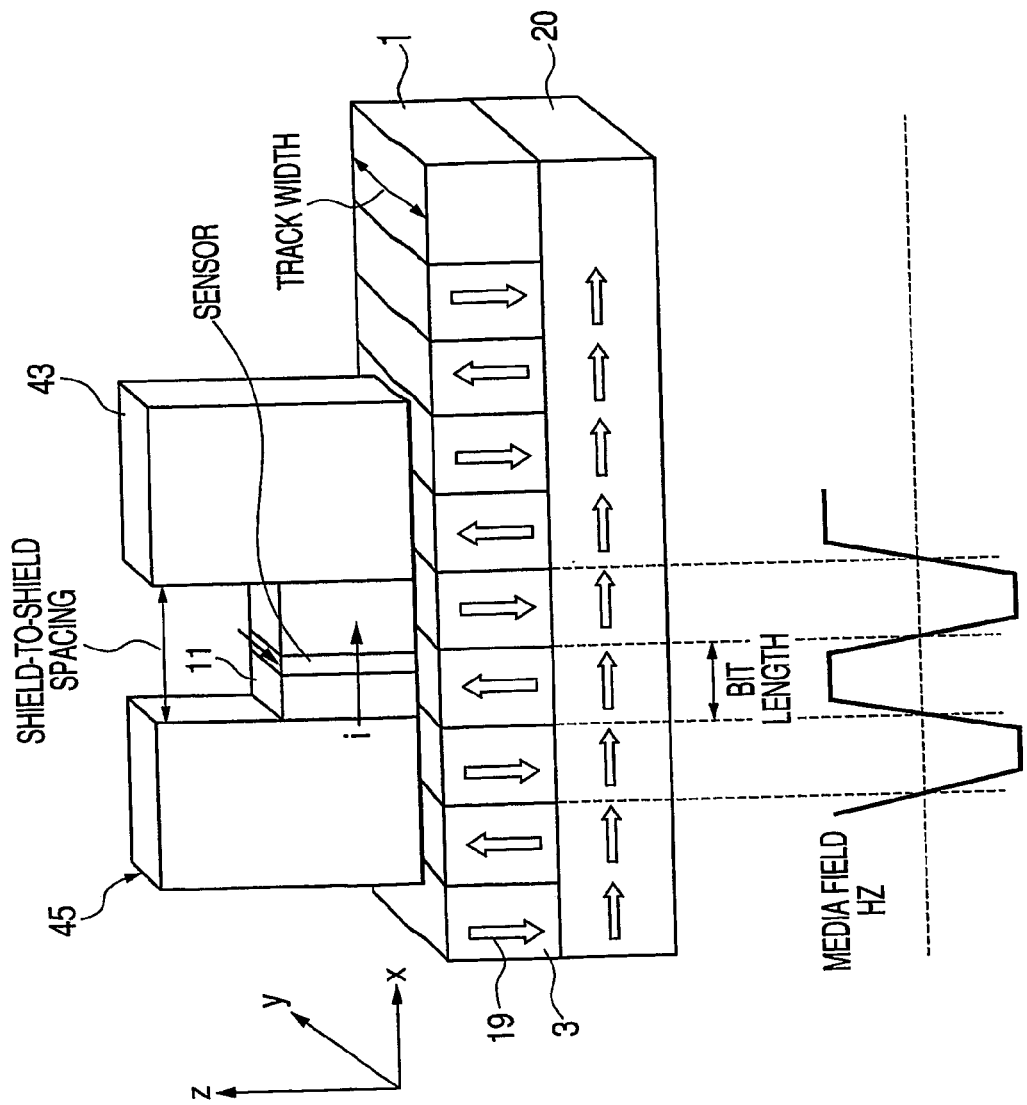
Figure 8:
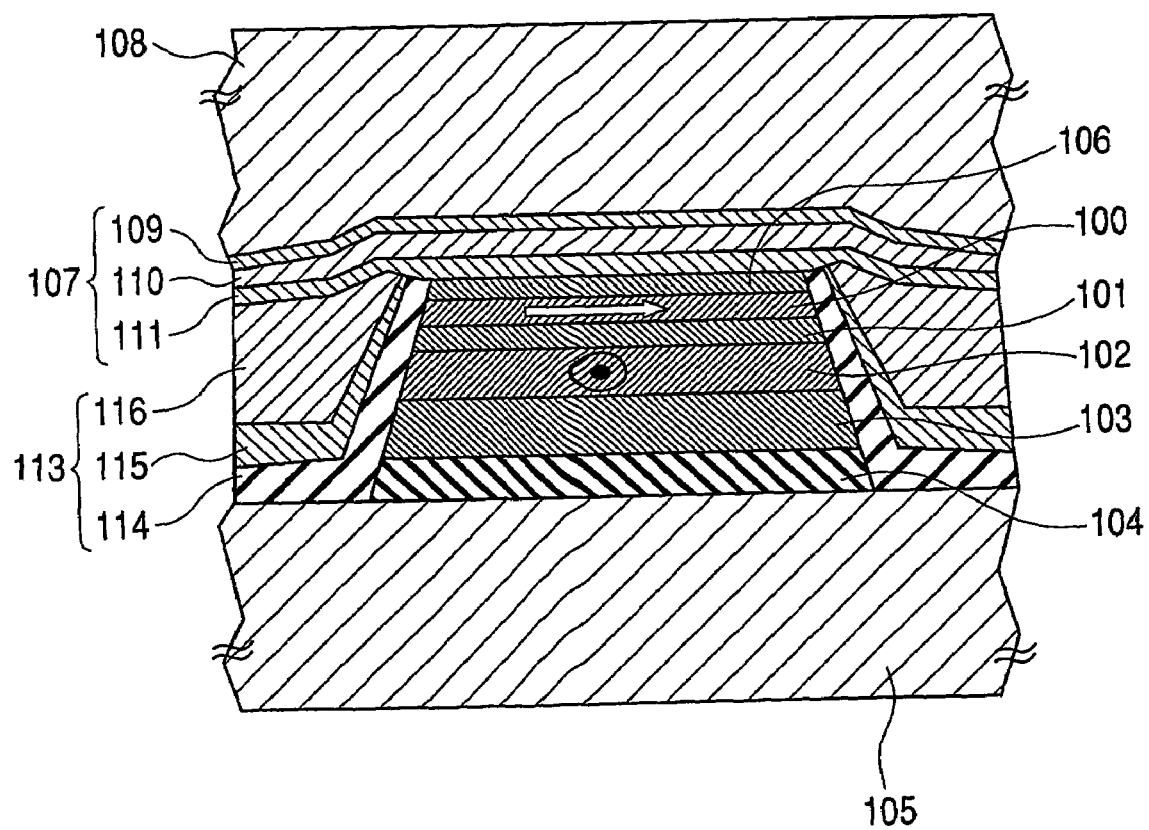
FIG. 8 illustrates a spin valve according to an exemplary, non-limiting embodiment of the present invention.

FIG. 8 illustrates a spin valve of a sensor for reading a magnetic medium according to an exemplary, non-limiting embodiment of the present invention. A spacer 101 is positioned between a free layer 100 and a pinned layer 102. As discussed above with respect to the related art, an external field is applied to the free layer 100 from a recording medium, such that the free layer magnetization direction can be changed. The pinned layer 102 has a fixed magnetization direction.

The pinned layer 102 can be a single or synthetic pinned layer, and has a thickness of about 2 nm to about 6 nm. The free layer 100 is made from a material having at least one of Co, Fe and Ni, and has a thickness below about 5 nm. Alternatively or in combination with the foregoing materials, the free layer 100 and/or the pinned layer 102 may be made of a half metal material that includes, but is not limited to, $Fe_3O_4$, $CrO_2$, NiFeSb, NiMnSb, PtMnSb, MnSb, $La_{0.7}Sr_{0.3}MnO_3$, $Sr_2FeMoO_6$ and $SrTiO_3$.

An anti-ferromagnetic (AFM) layer 103 is positioned on a lower surface of the pinned layer 102, and a buffer 104 is positioned on a lower surface of the AFM layer 103. A bottom shield 105 is provided below the buffer 104. Above the free layer 100, a capping layer 106 is provided.

Above the capping layer 106, an in-stack bias 107 is provided which has a greater width than the free layer 100. The in-stack bias 107 includes an AFM layer 109, a ferromagnetic layer 110 having a magnetization fixed by the AFM layer 109, and a decoupling conductive layer 111 provided between the free layer 100 and the stabilizing ferromagnetic layer that reduces exchange coupling. A top shield 108 is positioned on the in-stack bias 106. Because the in-stack bias 107 is conductive, highly resistive materials are generally not used.

On the sides of the sensor structure between the top shield 107 and the bottom shield 105, composed side shields 113 are provided. The side shields are provided to shield against the unwanted flux of adjacent tracks, and include a high-resistivity material. Each of the side shields 113 includes a thin insulator 114 (or gap layer) positioned on the bottom shield 105 and in contact with sides of the spin valve, such as the pinned layer 102 and the free layer 100. The gap layer 114 may be made of an insulator such as $Al_2O_3$, AlN, $SiO_2$ or $Si_3N_4$, but is not limited thereto.

A soft buffer layer 115 is provided on the insulator 114. While the buffer layer is preferably made of NiFe due to its high permeability and low coercivity, other materials exhibiting similar properties may be used in combination or substitution therefor. For example, but not by way of limitation, soft underlayers such as NiFe, Co—X and CoFeNi—X (where X is Zr and/or Re) may be used.

A side shield layer 116 is grown on the buffer layer 115. The side shield layer 116 is preferably made of CoFeN. However, as would be understood by one skilled in the art, compounds such as CoFeN, CoFeO, NiFeN, NiFeO, or any combination thereof may be used for the side shield layer 116 of the present invention. Further, the present invention is not limited thereto, and any equivalent material that also has high resistivity, low coercivity and high permeability may be used. Additionally, the insulator layer 114 may be made of any of the foregoing materials for the side shield layer 116, individually or in combination.

The buffer layer 115 provides a surface on which to grow the side shield layer 116, which has high resistance and high permeability. As a result of the foregoing side shield 113, the current is substantially prevented from migrating laterally across the side shield.

For all of the foregoing exemplary, non-limiting embodiments of the present invention, additional variations may also be provided. Further, the spacer 101 is conductive when the spin valve is used in CPP-GMR applications. Alternatively, for TMR applications, the spacer 101 is insulative (for example but not by way of limitation, $Al_2O_3$). When a connecting is provided as discussed above with respect to the related art, a BMR spacer may be provided, where nanocontact connections of less than about 30 nm is provided in an insulator matrix.

Additionally, while only top and bottom shields 105, 108 are shown, additional electrodes may be provided for conducting the sense current. Further, in an exemplary, non-limiting embodiment of the present invention, the sense current flows in a perpendicular direction with respect to the plane of the recording medium.

Figure 9F:
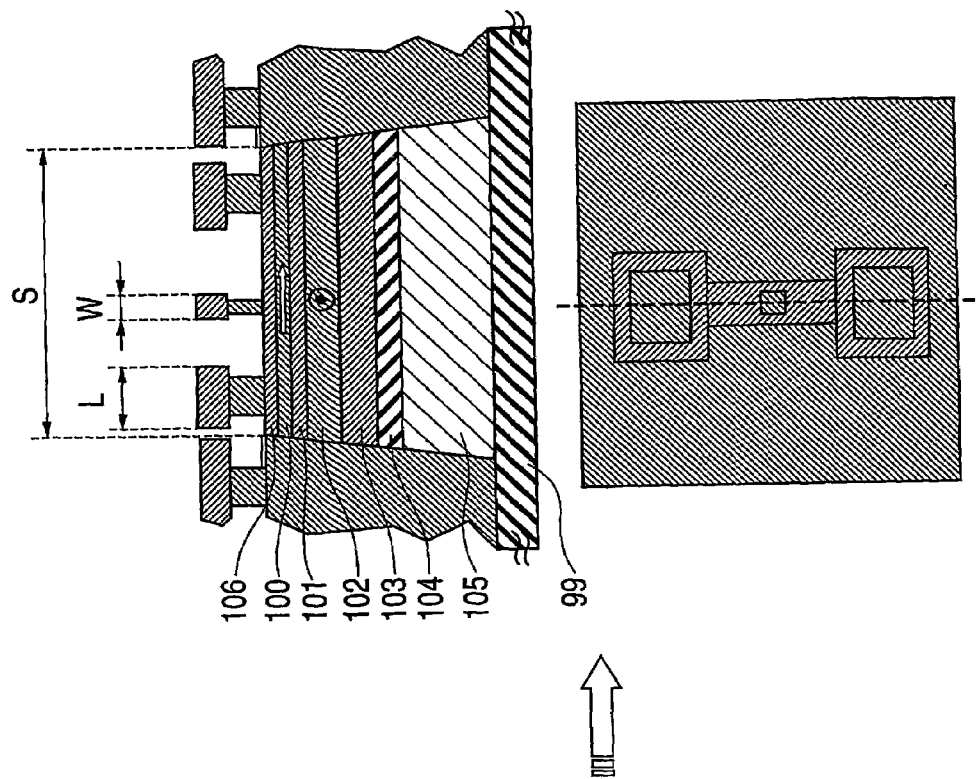
FIGS. 9 (a)-(m) illustrate a non-limiting, exemplary method of fabricating the present invention.

An exemplary, non-limiting method of manufacturing the foregoing structure of the present invention will now be described, as illustrated by FIGS. 9(a)-(n), which show top and cross-sectional views for various steps of manufacture. The materials used in the structure are described above, and where the material used in any given part of the structure is not disclosed, it is understood that such part of the structure may be made of those materials that are well-known in the art, or equivalents thereof.

FIG. 9(a) illustrates a part of the spin valve according to the present invention. Upon a wafer 99, films are deposited for the bottom shield 105, the buffer layer 104, the AFM layer 103, the pinned layer 102, the spacer (e.g., non-magnetic) 101, the free layer 100, and the capping layer 106.

A bi-layer resist film 201 and 202 are then deposited on the multilayer structure, as shown in FIG. 9 (b). The resulting structure is subjected to electron beam exposure, so as to develop the resist in the desired form.

Figure 9E:
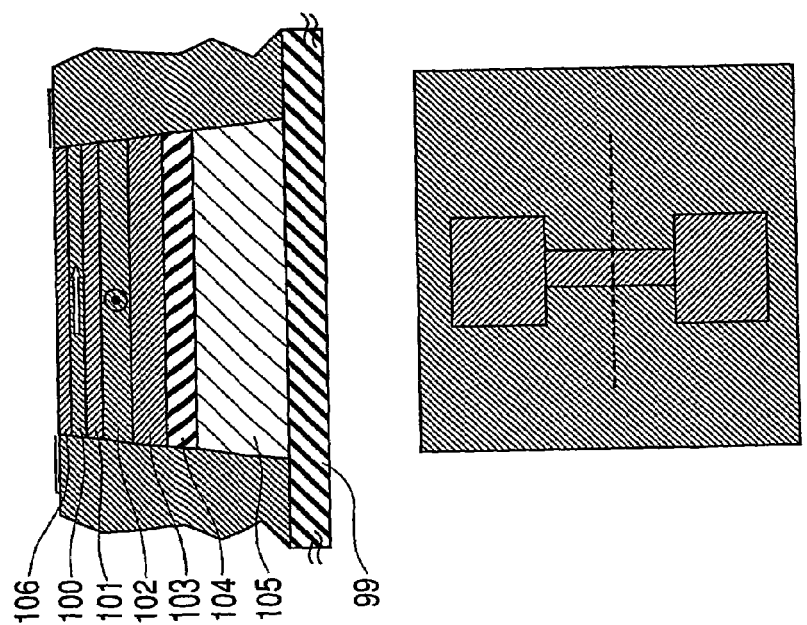
Figure 9M:
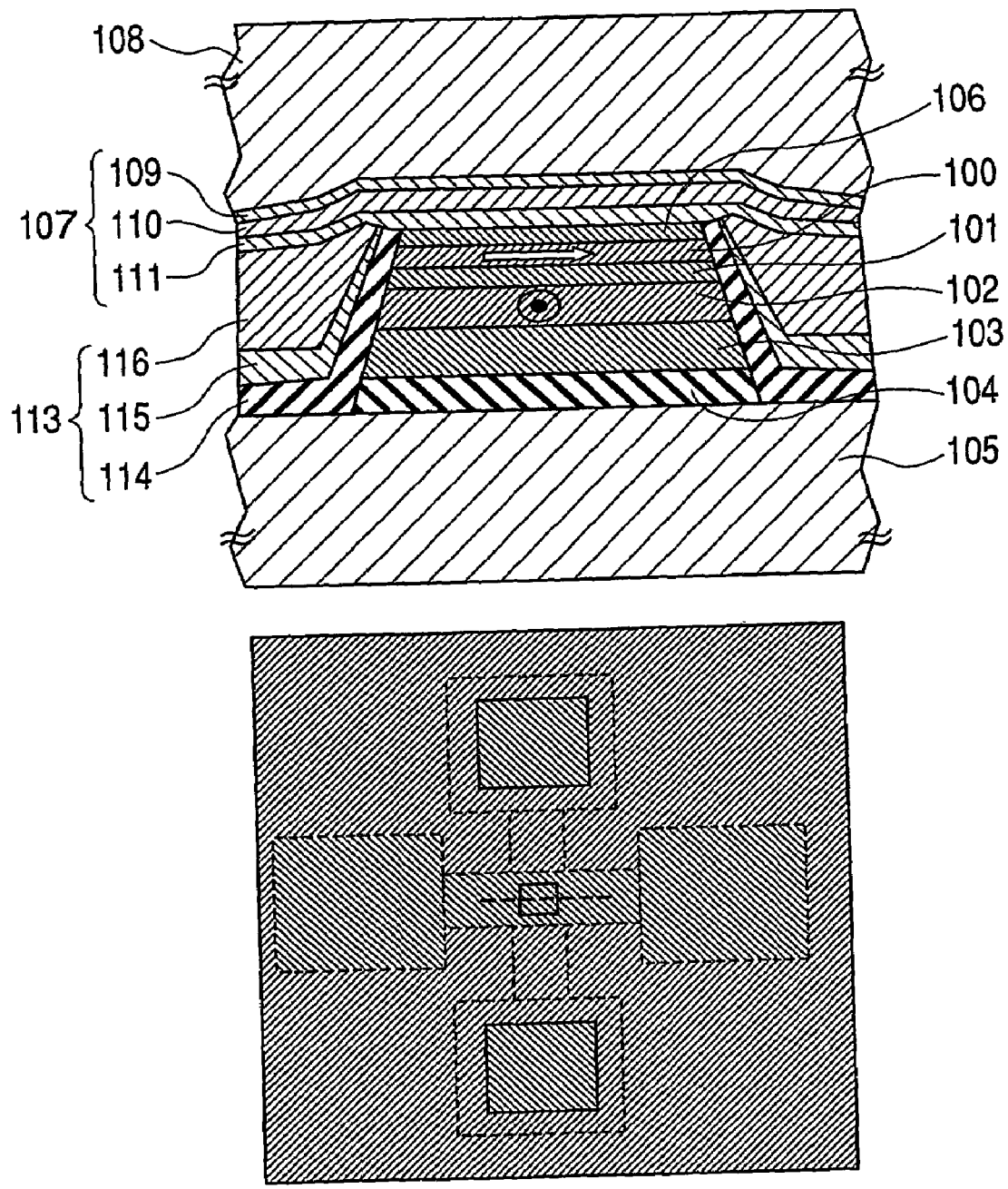
Figure 10:
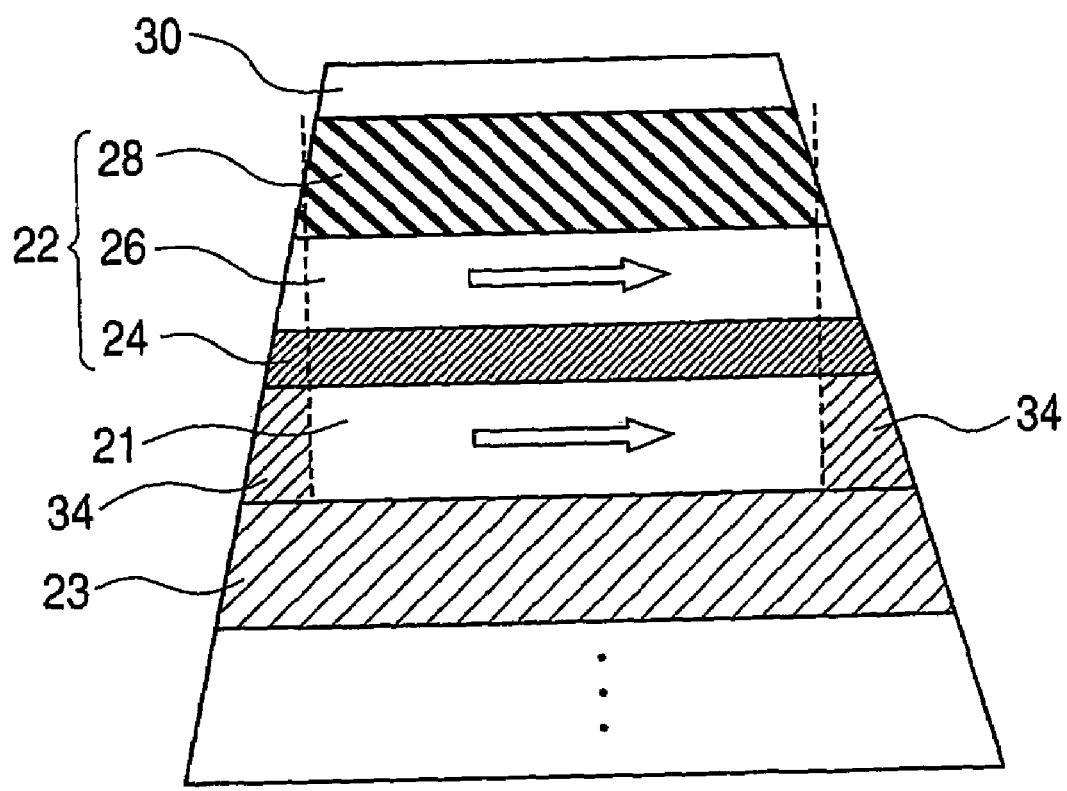
FIG. 10 illustrates a related art spin valve having a related art in-stack bias.

Next, the resulting substrate from the foregoing process is subjected to ion milling (also referred to as ion etching), such that the area not covered by the resist is etched to produce the structure shown in FIG. 9(c). An insulator is then deposited as shown in FIG. 9(d). A lift-off step, illustrated in FIG. 9(e), is then performed to remove the resist 202. In this step, etching (wet or dry) is performed to remove the excess deposited insulator above the level of the cap 106. However, the deposited insulator on the surface that was not part of the resist remains in this step.

As shown in FIG. 9 (f), another resist layer, subject to electron beam exposure, is generated. This resist layer will form the sensor. Some portions of the resist layer have a width W that corresponds to the sensor width (preferably about 100 nm or less, but not limited thereto), and the other portions of the resist layer have a width L that corresponds to the electrode contact size. A width S of the capping layer 106 is about 10 times as wide as W or a few microns.

As shown in FIG. 9 (g), ion milling is performed to produce insulation on the portions of the spin valve inside the side shields. FIGS. 9 (h)-(m) provide a zoomed-out illustration of the formation of one of the sensors, as delineated by the dotted line in FIG. 9 (g). FIG. 9 (h) illustrates the ion milling step of FIG. 9 (g), showing the details of the layers of the spin valve. The areas not covered by the resist have been milled to form the spacer in its preferred dimensions.

In FIG. 9(i), ion beam deposition (IBD) of the insulator 114, buffer 115 and shield layer 116 is performed, using the above-noted materials. In FIG. 9(j), the mask is removed. The in-stack bias and the top shield are then developed, as illustrated in FIGS. 9(k)-(l). Next, a resist is deposited on the existing substrate, followed by electron beam exposure and development. The final device is then produced according to FIG. 9(m), where the mask used in making the top shield and in-stack bias is lifted.

The present invention has various advantages. For example, but not by way of limitation, the in-stack bias of the present invention has a width that spans the entire free layer, such that there is no area outside the in-stack bias. As a result, the related art problems associated with the area of the free layer outside of the related art in-stack bias are substantially eliminated.

The top shield may be made of the insulator, or alternatively, a protective layer can be formed using additional mask on the electrodes, followed by deposition thereon. While the additional step may be used, it is not necessary, as the top shield formed of the insulator protects the magnetic sensor.

The present invention is not limited to the specific above-described embodiments. It is contemplated that numerous modifications may be made to the present invention without departing from the spirit and scope of the invention as defined in the following claims.

The invention claimed is:

1. A magnetic sensor having a spin valve, comprising:
a free layer having an adjustable magnetization direction in response to a magnetic flux;
a pinned layer having a fixed magnetization in accordance with an antiferromagnetic (AFM) layer positioned on a surface of said pinned layer opposite a spacer sandwiched between said pinned layer and said free layer;
a buffer sandwiched between said AFM layer and a bottom shield that shields undesired flux at a first outer surface of said magnetic sensor;
a capping layer sandwiched between said free layer and a top shield that shields undesired flux at a second outer surface of said magnetic sensor;
a side shield positioned on a side of said magnetic sensor; and
an in-stack bias positioned between said capping layer and said top shield vertically and comprising a ferromagnetic layer and a conductive layer sandwiched between the free layer and the ferromagnetic layer, wherein said in-stack bias is substantially wider than said free layer, the in-stack bias extending to cover at least a part of the side shield, and wherein the conductive layer and the ferromagnetic layer cover a same area.

2. The magnetic sensor of claim 1, wherein said spin valve is a bottom type and said pinned layer is one of (a) single-layered and (b) multi-layered with a spacer between sublayers thereof.

3. The magnetic sensor of claim 1, wherein said spacer is one of:
(a) an insulator for use in a tunnel magnetoresistive (TMR) spin valve;
(b) a conductor for use in a giant magnetoresistive (GMR) spin valve; and
(c) an insulator matrix having a magnetic nanocontact between said pinned layer and said free layer for use in a ballistic magnetoresistive (BMR) spin valve.

4. The magnetic sensor of claim 3, wherein said insulator comprises $Al_2O_3$.

5. The magnetic sensor of claim 3, wherein said magnetic nanocontact has a diameter of less than about 30 nm.

6. The magnetic sensor of claim 1, wherein the in-stack bias comprises:
an antiferromagnetic layer;
a ferromagnetic layer having a magnetization fixed by the antiferromagnetic layer; and
a conductive layer sandwiched between the free layer and the ferromagnetic layer for reducing exchange coupling between the free layer and the ferromagnetic layer.

7. The magnetic sensor of claim 1, wherein said pinned layer has one of a single layer structure and a synthetic structure, and a total thickness between about 2 nm and about 10 nm.

8. The magnetic sensor of claim 1, wherein said free layer comprises at least one of Co, Fe, and Ni, and said free layer has a thickness of less than about 5 nm.

9. The magnetic sensor of claim 1, wherein a portion of said in-stack bias positioned on the top of the free layer is ferromagnetic and comprises at least one of CoFe, NiFe, and CoFeNi.

10. The magnetic sensor of claim 1, said side shield positioned on said sides of said magnetic sensor comprising:
a gap layer made of an insulator film including at least one of $Al_2O_3$, AlN, $SiO_2$ and $Si_3N_4$,
a high permeability and low coercivity soft underlayer positioned on said gap layer and made of at least one of NiFe, Co—X and CoFeNi—X, wherein X is at least one of Zr and Re; and
the side shield layer comprising at least one of at least one of CoFeO, NiFeN, NiFeO and CoFeN.

11. The magnetic sensor of claim 1, wherein at least one of said pinned layer and said free layer includes $Fe_3O_4$, $CrO_2$, NIFeSb, NiMnSb, PtMnSb, MnSb, $La_{0.7}Sr_{0.3}MnO_3$, $Sr_2FeMoO_6$, $SrTiO_3$, CoFeO, NiFeN, NiFeO, NiFe and CoFeN.

12. The magnetic sensor of claim 1, further comprising leads in at least one of said top shield and said bottom shield for conducting a sense current of said magnetic sensor.

13. The magnetic sensor of claim 1, wherein a sense current applied to said magnetoresistive sensor flows perpendicular to a plane of the spin-valve.

14. A magnetic sensor having a spin valve, comprising:
a free layer having an adjustable magnetization direction in response to a magnetic flux;
a pinned layer having a fixed magnetization in accordance with a first antiferromagnetic (AFM) layer positioned on a surface of said pinned layer opposite a spacer sandwiched between said pinned layer and said free layer;

a buffer sandwiched between said first AFM layer and a bottom shield that shields undesired flux at a first outer surface of said magnetic sensor;

a capping layer sandwiched between said free layer and a top shield that shields undesired flux at a second outer surface of said magnetic sensor;

a side shield positioned on a side of said magnetic sensor; and an in-stack bias positioned between said capping layer and said top shield vertically and comprising a second AFM layer and a conductive layer, wherein said in-stack bias is substantially wider than said free layer, the in-stack bias extending to cover at least a part of theside shield, and wherein the conductive layer and the second AFM layer cover a same area.

15. A magnetic sensor having a spin valve, comprising:

a free layer having an adjustable magnetization direction in response to a magnetic flux;

a pinned layer having a fixed magnetization in accordance with a first antiferromagnetic (AFM) layer positioned on a surface of said pinned layer opposite a spacer sandwiched between said pinned layer and said free layer;

a buffer sandwiched between said first AFM layer and a bottom shield that shields undesired flux at a first outer surface of said magnetic sensor;

a capping layer sandwiched between said free layer and a top shield that shields undesired flux at a second outer surface of said magnetic sensor;

a side shield positioned on a side of said magnetic sensor; and an in-stack bias positioned between said capping layer and said top shield vertically, wherein said in-stack bias is substantially wider than said free layer, the in-stack bias extending to cover at least a part of the side shield, and wherein the in-stack bias is a synthetic layer comprising at least a second AFM layer that is substantially wider than said free layer.

* * * * *